US006279083B1

(12) United States Patent
MacDonald

(10) Patent No.: US 6,279,083 B1
(45) Date of Patent: Aug. 21, 2001

(54) CIRCUIT AND METHOD OF CONTROLLING CACHE MEMORY

(75) Inventor: Colin MacDonald, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/275,617

(22) Filed: Mar. 24, 1999

(30) Foreign Application Priority Data

Mar. 27, 1998 (GB) .................................................. 9806494

(51) Int. Cl.[7] .................................................. G06F 12/00
(52) U.S. Cl. .................... 711/138; 711/105; 711/209; 711/3
(58) Field of Search .................................. 711/138, 139, 711/105, 3, 209

(56) References Cited

U.S. PATENT DOCUMENTS 5,157,774 * 10/1992 Culley .................................... 711/139
5,214,610 * 5/1993 Houston ............................. 365/233.5
5,265,236 * 11/1993 Mehring et al. ...................... 711/203
5,664,148 * 9/1997 Mulla et al. .......................... 711/138

* cited by examiner

*Primary Examiner*—Do Hyun Yoo
*Assistant Examiner*—Hong Kim
(74) *Attorney, Agent, or Firm*—Robert F. Hightower

(57) ABSTRACT

A memory controller (26) compares the current address and the previous address sent by a microprocessor (12). If the addresses are DRAM addresses and the current row address matches the previous row address, i.e. same DRAM page access, then the memory controller disables caching (28) of the same DRAM page access. The same DRAM page access disables caching because the same DRAM page access is not substantially longer than a cache access. A counter (50) and comparator (52) allows the memory controller to hold off some number of same DRAM page accesses before disabling caching to give time for the memory controller to set up to the new page.

11 Claims, 2 Drawing Sheets

CIRCUIT AND METHOD OF CONTROLLING CACHE MEMORY

BACKGROUND OF THE INVENTION

The present invention relates in general to computing systems and, more particularly, to a memory controller that restricts the type of memory device that is cached.

Many modern computer systems use cache memory to speed up storage and retrieval operations. A cache comprises two small blocks of fast access memory. The main block is used to store data, the other is used to store part of the address associated with the data. When the system performs an access to a standard memory (RAM or ROM) the transmitted data may be temporarily stored in the cache. If a subsequent transaction is directed to the same location as the previous one, then the desired data may exist in the cache. Since data transfers from the cache are typically much faster than from standard memory, the overall data transfer rate increases.

The person writing or coding system software designates blocks of storage locations (memory) as cacheable or non-cacheable. If a location is classified as cacheable, then for any read of that location, the microprocessor first checks if the data is held in the cache. The data includes instructions, addresses, alpha-numeric values, etc. If the data is held in the cache, then the data is read from the cache. If the data is not held in the cache, then the data is fetched from the addressed location in the standard memory. Usually, but depending on the cache storage algorithm employed, this data and an associated address field are also placed in the cache. If the memory location is marked as non-cacheable, then all requests are directed to the memory location. For most, if not all, prior art cache controllers, all locations within an address range marked cacheable will be operated on identically. That is, if a location is marked cacheable and its data is not held in the cache, then designated types of accesses made to that location will always result in the data being stored in the cache. No allowance is made for the structure of the accessed memory or the history of previous accesses.

Hence, a need exists for a memory controller that selectively caches based on the access history and the structure of the cached memory.

DETAILED DESCRIPTION OF THE PREFERRED EMBODIMENT

Figure 1:
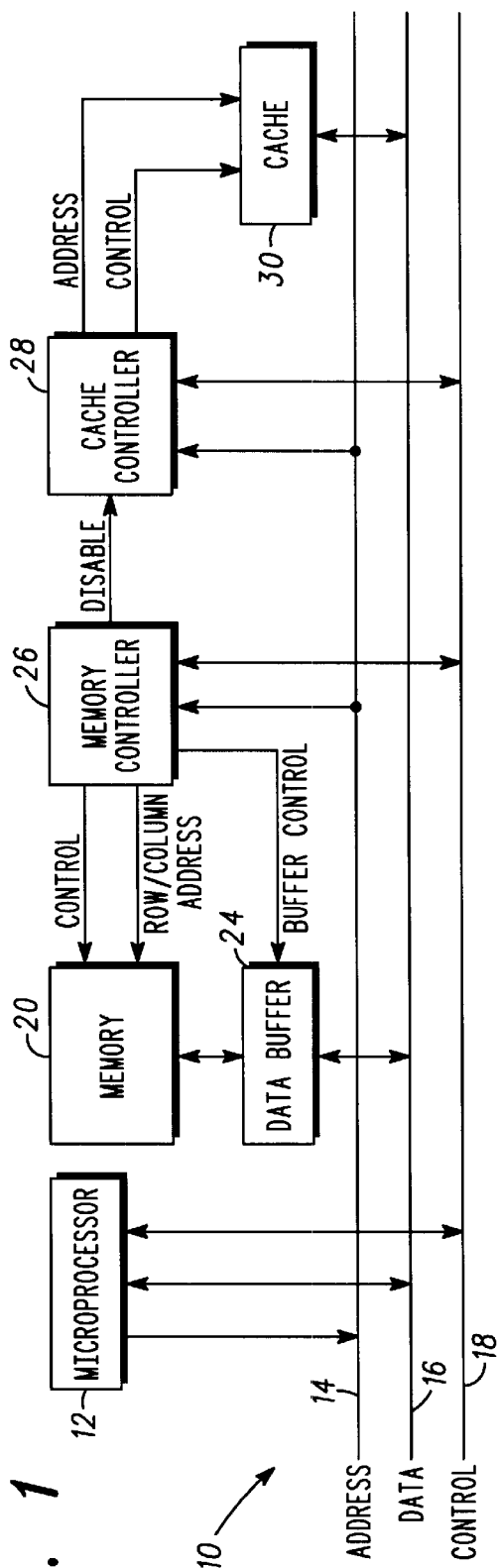
FIG. 1 is a block diagram illustrating a computer system with controllers for the memory and cache.

Referring to FIG. 1, a computer system 10 is shown suitable for use as a personal computer, network workstation, or embedded system. Computer system 10 includes a microprocessor 12 that interacts with peripheral devices by way of address bus 14, data bus 16, and control bus 18. Microprocessor 12 provides address signals on address bus 14. Microprocessor 12 also sends and receives data signals on data bus 16 and control signals on control bus 18. Memory 20 supplies and accepts data through data bus 16. Data buffer 24 buffers the data between memory 20 and data bus 16 in response to BUFFER CONTROL signals from memory controller 26. Memory controller 26 receives address signals from address bus 14 and control signals from control bus 18. Memory controller 26 provides control signals and row/column addresses to memory 20. Cache controller 28 receives address signals from address bus 14 and control signals from control bus 18. Cache controller 28 provides control signals and address signals to cache 30. Cache 30 is implemented as fast access memory which sends and receives data from data bus 16.

One type of memory block that is frequently accessed by the microprocessor is page-mode dynamic random access memory (DRAM). Page-mode DRAM can be described as a 2-dimensional array of storage elements with row and column addressing. Storage elements that share the same row address are said to lie within the same page, and so DRAM can be thought of as a series of consecutive pages, e.g. page 0, page 1, through page n, where one page includes say 4 Kbytes of data. In most systems, higher order bits of the processor address define the row location and the lower order bits define the column location. Once a page is addressed, the processor may access other locations within the same page, or locations on a different page. Many types of DRAM offer an enhanced access capability known as fast page mode. For same page accesses to fast page mode DRAM, only the new column address need be supplied since the row address does not change. Consequently, same page accesses are faster than accesses to other pages.

A cache access requires, for example, one system clock cycle to complete the operation. An access to the same page of DRAM, i.e. same row address but a different column address, takes say two system clock cycles. An access to a different page of DRAM, i.e. different row address, takes say five clock cycles. The time required to perform an access from the same page of DRAM (two clocks) is not substantially longer than a cache access (one clock). On the other hand, significant time savings can be realized by caching an access to a different page (five clocks).

Caching all DRAM accesses, i.e. new page accesses and same page accesses, as is common in the prior art, requires that portions of the cache are utilized in storing accesses made to the same page. However, the time savings provided by caching same page accesses are smaller than the time savings provided by caching new page accesses. Caching new page and same page accesses leads to greater competition for cache storage locations. With a limited cache size, this may lead to new page data being removed to make room for same page data, reducing the level of time savings produced. Thus, in systems where the cache size is critical in terms of cost or performance and same page accesses are acceptably fast, then it is more efficient to only cache accesses to new pages.

In the present embodiment, memory 20 is a page-mode DRAM storage device. The DRAM is a 2-dimensional array of addressable storage elements. Storage elements within the array are accessed by supplying a pair of co-ordinates known as the row and column address. Memory controller 26 receives the address signal from microprocessor 12 on address bus 14. Memory controller 26 converts the address signal into a row/column address signal, which is typically a multiplexed signal. The row/column address transmits a row select, typically the more significant bits of the address signal from address bus 14, at one time to select a particular row in the DRAM. The row/column address signal transmits a column select, typically the less significant bits of the address signal from address bus 14, at another time to select a particular column. For example, an address "01011000" from address bus 14 could have a row select of "0101" and a column select "1000". The combination of one row select and one column select addresses one location in the DRAM array.

Figure 2:
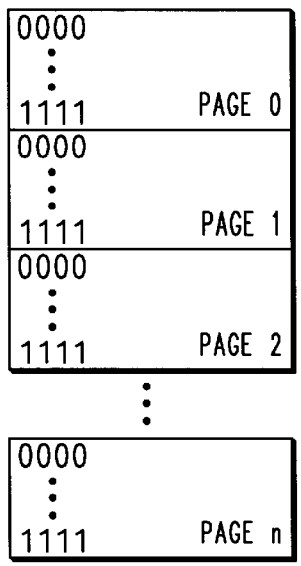
FIG. 2 is a linear address map of the memory.

Memory 20 is logically organized into pages as shown in the linear address map of FIG. 2. The row select defines the page and the column select identifies a particular location on the page. Row select "0000" defines page 0, row select "0001" defines page 1, and so on. Column select "0000" defines location 0 of the current page, column select "0001" defines location 1 of the current page, and so on. Thus, to address location "0000" of page 0, microprocessor 12 sends an address of "00000000" to memory controller 26. To address location "1000" of page 1, microprocessor 12 sends an address of "00011000" to memory controller 26.

Cache controller 28 receives address and control signals from microprocessor 12 to address and control cache 30. As a feature of the present invention, memory controller 26 provides a DISABLE control signal to cache controller 28 to inhibit or disable the allocation of storage locations in cache 30. The DISABLE control signal is asserted for consecutive accesses to the same page as the previous access, i.e. same row address as previous address, greater than a predetermined count. The DISABLE control signal is not asserted otherwise.

Assume the DISABLE signal is not asserted. Upon receiving a memory read access, cache controller 28 retrieves the desired data from cache 30, if valid data is found there, and places it on data bus 16. If valid data is not found in cache 30, then the data is retrieved from memory 20 and a storage field is allocated in cache 30. The retrieved data is stored in cache 30 for future use.

If the DISABLE signal is asserted, then the allocation of a new entry in cache 30 for the storage of the data is disabled. If DISABLE is asserted and valid data happens to be in cache 30, then the data is retrieved from the cache. If DISABLE is asserted and valid data is not found in the cache, then the data is retrieved from memory 20. The present invention prevents allocation of a storage field in cache 30 when DISABLE is asserted. For a DRAM, a same page access can be performed directed to the DRAM in substantially the same time as a cache access. Caching same page accesses does not provide significant time savings and in fact can reduce overall efficiency by de-allocating a storage field containing a different page access. The cache should be reserved for accesses to different pages where caching provides more time savings.

Figure 3:
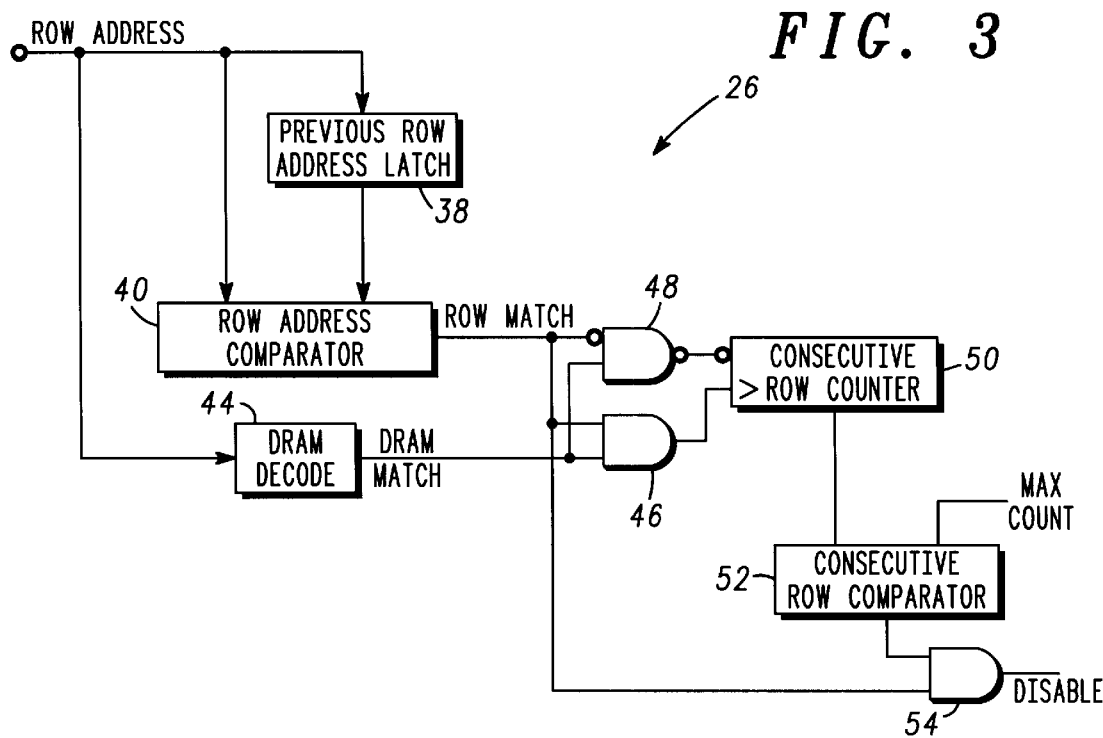
FIG. 3 is a block diagram illustrating further detail of the memory controller.

Turning to FIG. 3, further detail of memory controller 26 is shown. The row address is applied to row address comparator 40 and to previous row address latch 38. Latch 38 stores and outputs applied addresses but its output is only updated after the comparison described below has been performed. At the time of the comparison, latch 38 outputs the address applied before the current address. Row address comparator 40 compares the current row address with the previous row address stored in latch 38. If the current row address matches the previous row address, i.e. current access is to the same row (same page) as the previous access, then ROW MATCH goes to logic one. If the current row address does not match the previous row address, i.e. current access is to a different row (different page) than the previous access, then ROW MATCH goes to logic zero.

The microprocessor address is applied to DRAM decode 44. DRAM decode 44 uses a logic structure to decode the address. DRAM decode 44 derives the DRAM MATCH signal from the logic decode. DRAM MATCH is logic one if the address corresponds to memory 20, i.e. the current address is to a page-mode DRAM memory device. DRAM decode 44 sets DRAM MATCH to a logic zero if the address corresponds to any other address. Examples of non-valid DRAM MATCH addresses include those relating to other memories (ROM, SRAM, and non-page-mode DRAM) and system peripherals. Thus, DRAM decode 44 detects accesses to the selected memory 20, which is a page-mode DRAM, based on the microprocessor address and enables the counting circuits and cache allocation control function as described below. DRAM decode 44 restricts the DISABLE feature of the present invention to accesses to a particular type of memory device, e.g. a page-mode DRAM.

If the ROW MATCH is logic zero, i.e. the current access is to a different page than previous access, and the DRAM MATCH signal is a logic one, i.e. valid DRAM address, then NAND gate 48 provides a logic zero to the active-low reset input of counter 50. Counter 50 is reset to a value of zero. Each time an access is made to a different DRAM page, counter 50 is reset to zero. The logic zero ROW MATCH signal sets the output of AND gate 54 to logic zero, thereby negating or non-asserting the DISABLE control signal. Cache controller 28 continues normal operation when the DISABLE signal is negated. Thus, an access to a different page allows cache controller 28 to allocate an entry in cache 30 if required.

If current row address matches the previous row address, i.e. access to same page as previous access, then ROW MATCH is logic one. If the DRAM MATCH is also logic one, i.e. an access to DRAM memory 20, then NAND gate 48 provides a logic one to the reset input of counter 50. Counter 50 does not reset. The output of AND gate 46 goes to logic one which clocks counter 50 and increments its value by one. For a first same DRAM page access, counter 50 increments to a value of one. MAX COUNT is set to a value of two. Counter 50 is less than MAX COUNT so the output of comparator 52 remains logic zero. The DISABLE signal is negated as logic zero. A second consecutive access to the same page in memory 20, increments counter 50 to a value of two. Counter 50 is now equal to MAX COUNT and the output of comparator 52 goes to logic one. The DISABLE signal switches to logic one and disables cache controller 28 from allocating space in cache 30 for the second same page access. Each subsequent and consecutive same page access to memory 20 increments counter 50 to a value greater than MAX COUNT. The output of comparator 52 remains logic one and the DISABLE signal continues to inhibit cache controller 28 from allocating space in cache 30. Any different page access to memory 20 resets counter 50 and negates the DISABLE signal.

Recall that a same page access (nominally two clocks) to DRAM is only slightly longer than a cache access (nominally one clock). There is an overhead for the memory controller to set up the current page. Therefore, in the present example, the first access to a DRAM page is cached because there is a significant time difference between the cache access and the first access to a DRAM page. The second or greater same DRAM page access inhibits caching because, once the memory controller is set up, an access to the same DRAM page is much faster than an access to a new DRAM page and may not be substantially longer than a cache access. This is true at least for page-mode DRAM accesses. Therefore, memory controller 26 detects an access to DRAM type of memory device based on the microprocessor address 14. For page-mode type of DRAM memory devices, same page accesses after the memory controller is set up are not cached because there is no overall benefit to the computer system in terms of performance or cost. It is more efficient to directly access the same DRAM page from memory 20. The cache is reserved for different page accesses and same page accesses before the memory controller is set up.

In an alternate embodiment, MAX COUNT may be set to a value of one if less time is needed to set up the memory controller. On the other hand, MAX COUNT could be set to a value greater than two if more time is needed to set up the memory controller.

In summary, the present invention compares the current row address and the previous row address in the memory controller. If the addresses are DRAM addresses and the current row address matches the previous row address, i.e. an access to the same DRAM page is occurring, then the memory controller inhibits or disables the allocation of a storage field in the cache. The same DRAM page access inhibits allocation because the same DRAM page access is much faster than a new page access. By retrieving same page accesses directly from memory, more room in the cache is made available for new page accesses or the cache size may be reduced. The memory controller can enable the caching of some number of accesses to a new page to give itself time to setup for the new page.

What is claimed is:

1. A computing system for accessing data, comprising:
    a processor (12) for generating an address signal;
    a memory (20) for storing data which is accessed by the processor;
    a memory controller (26) coupled for receiving the address signal from the processor and controlling access to the memory, where the memory controller detects access to a selected type of the memory and provides a disable signal when a current address matches a previous address for the selected type of memory;
    a cache memory (30) for storing the data which is accessed by the processor; and
    a cache controller (28) coupled for receiving the disable signal to disable the cache memory to prevent caching the data when the current address matches the previous address for the selected type of memory.

2. The computing system of claim 1 wherein the memory includes dynamic random access memory (DRAM).

3. The computing system of claim 2 wherein the DRAM is a page-mode DRAM addressed by a row address and a column address.

4. The computing system of claim 1 wherein the memory controller includes:
    a latch (38) for storing the previous address; and
    a first comparator (40) having a first input coupled for receiving the current address, a second input coupled for receiving the previous address, and an output for providing a row match signal.

5. The computing system of claim 4 wherein the memory controller further includes:
    a decoder (44) coupled for receiving the address signal and having an output for providing an asserted output signal when the decoder identifies the address signal as corresponding to the selected type of memory;
    a first logic gate (46) having a first input coupled for receiving the row match signal, and a second input coupled to the output of the decoder; and
    a counter (50) having a clock input coupled to an output of the first logic gate.

6. The computing system of claim 5 wherein the memory controller further includes a second logic gate (48) having a first input coupled for receiving the row match signal, a second input coupled to the output of the decoder, and an output coupled to a reset input of the counter.

7. The computing system of claim 6 wherein the memory controller further includes:
    a second comparator (52) having a first input coupled to an output of the counter, and a second input coupled for receiving a maximum count signal; and
    a third logic gate (54) having a first input coupled for receiving the row match signal, a second input coupled to an output of the second comparator, and an output for providing the disable signal.

8. A method of controlling memory cache, comprising the steps of:
    generating an address signal with a processor (12);
    accessing data stored in a memory (20) with the address signal;
    decoding the address signal to detect access to a selected type of the memory;
    comparing a current address and a previous address to provide a row match signal; and
    disabling allocating the data to a cache memory (30) when the row match signal indicates a match between the current address and the previous address for the selected type of memory.

9. The method of claim 8 wherein the selected type of memory is a dynamic random access memory (DRAM).

10. The method of claim 9 wherein the DRAM is a page-mode DRAM addressed by a row address and a column address.

11. The method of claim 8 further includes the steps of:
    counting consecutive matches between the current address and the previous address; and
    disabling the cache memory when the consecutive matches between the current address and previous address reaches a maximum count.

* * * * *